Patented Nov. 25, 1924.

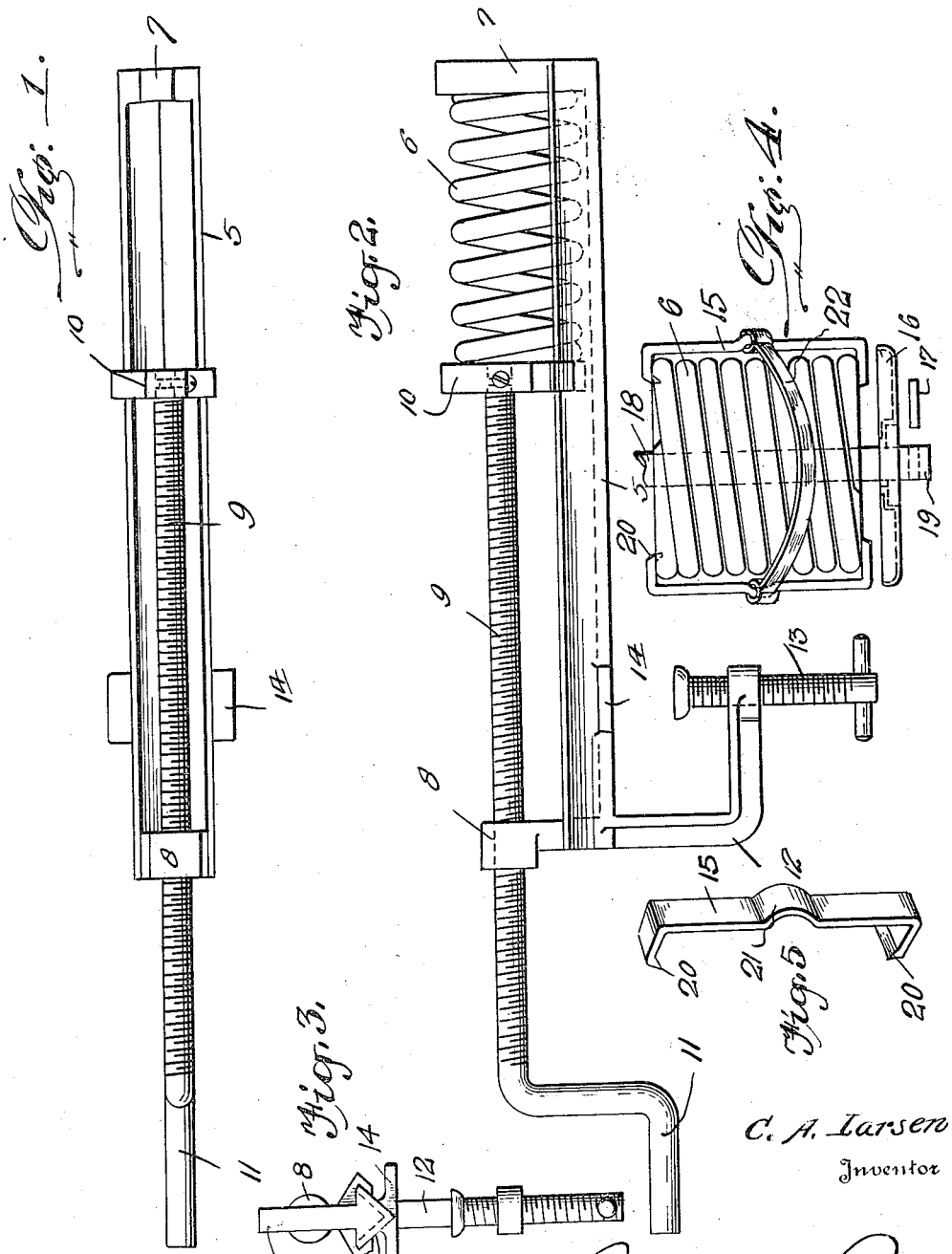
Nov. 25, 1924.
C. A. LARSEN
1,516,860
APPARATUS FOR FACILITATING ASSEMBLING OF VALVES AND THEIR SPRINGS
Filed Oct. 23, 1923

1,516,860

UNITED STATES PATENT OFFICE.

CHARLES A. LARSEN, OF DENVER, COLORADO.

APPARATUS FOR FACILITATING ASSEMBLING OF VALVES AND THEIR SPRINGS.

Application filed October 23, 1923. Serial No. 670,319.

*To all whom it may concern:*

Be it known that I, CHARLES A. LARSEN, citizen of the United States, residing at Denver, in the county of Denver and State of Colorado, have invented certain new and useful Improvements in Apparatus for Facilitating Assembling of Valves and Their Springs, of which the following is a specification.

This invention relates to an apparatus for facilitating assembling of valves and their springs whereby the retaining means for the springs may be readily placed on the valve stems.

In grinding a set of intake and exhaust valves of an internal combustion engine, there is much more time spent in replacing the springs on the valve stems, than is spent in all of the remaining operations.

Also, the replacement of the springs involve tedious and arduous labor.

It is accordingly an object of the present invention to provide means whereby this work can be done in much less time and with comparative facility and ease. Briefly described, the apparatus embodies a spring compressed device adapted to be employed for compressing the springs and to hold them so that a pair of clips which keep the springs securely compressed, may be placed on each side of each spring, whereby the spring retaining means can be easily put in place on the stems of the valves after the springs have been placed thereon.

Other objects will appear as the nature of the invention is better understood, and the same consists in the novel form, combination, and arrangement of parts hereinafter more fully described, shown in the accompanying drawings and claimed.

In the drawings, wherein like reference characters indicate corresponding parts throughout the several views:

Figure 1 is a top plan view of a spring compressing device forming part of an apparatus constructed in accordance with the present invention.

Figure 2 is a side elevational view of the device shown in Figure 1.

Figure 3 is an end elevational view looking toward the left of Figures 1 and 2.

Figure 4 is a fragmentary elevational view illustrating a spring held compressed by means of clips constructed in accordance with the present invention, and positioned upon a valve stem so as to permit ready engagement of the spring retaining means with said valve stem, and Figure 5 is a perspective view of one of the clips shown in Figure 4.

Referring more in detail to the drawing, the present invention embodies a spring compressing device shown in Figures 1 to 3 inclusive and which embodies a horizontal channel member or trough 5 which is preferably of V-shape in cross section with the walls thereof arranged in upwardly diverging relation as shown clearly in these views. The spring 6 to be compressed is adapted to be positioned in one end of this channel and the latter is compartively shallow so as to leave the major upper portion of the spring 6 exposed for a purpose which will presently become apparent, it being noted that by reason of the cylindrical form of the spring and the V-shape of the channel member in cross section, the spring will have a substantially two point bearing upon the inner surfaces of the walls of said channel 5 so as to reduce friction to a minimum whereby the spring may be easily compressed. One end of the channel 5 is closed by means of an end wall 7 that is rigid with the channel and projects upwardly beyond the upper edges of the walls of the latter to form an abutment or jaw for one end of the spring as shown in Figure 2. A post 8 is rigid upon the outer end of the channel or trough member 5, and is provided with a threaded opening engaged by a screw threaded member or operating screw 9 that is arranged longitudinally of and above the body portion of the channel 5. The inner end of the screw 9 is swivelled in a movable jaw plate 10 that has its lower end slidably engaged with the walls of the channel 5 whereby the same is effectively guided in its sliding movement longitudinally of the channel toward or away from the rigid spring abutment 7. The other or outer end of the screw 9 is provided with a suitable crank or handle 11 by means of which manual rotation of the adjusting screw 9 may be facilitated for threading the same thru the post 8 and causing movement of the jaw 10. For facilitating mounting of this device upon the running board of an automobile, table or the like, a screw clamp is provided including an angular arm rigid with the end of the channel 5 adjacent the posts 8 and depending therefrom, the horizontal lower arm portion of which has a vertical clamping screw 13 threaded therethrough for engagement with the under side of the running board or table. A pair of transversely aligned horizontal lugs 14 are provided on the bottom of the channel 5 so as to extend laterally in opposite directions from the latter directly above the upper end of the clamping screw 13 to act as a jaw for engaging the upper surface of the running board or table.

The present invention also embodies a pair of similar substantially U-shaped comparatively rigid clips 15 adapted to be positioned at opposite sides of the spring 6 and engage over the opposite ends thereof when compressed, for holding said spring compressed in the position shown in Figure 4, so that the usual spring retaining means including the washer or embossed disc 16 and pin 17 may be easily engaged with the valve stem 18. In other words, when the spring is held compressed in this manner, the same may be placed upon the valve stem 18 and leave sufficient room for placing the disc 16 thereon and for permitting ready placement of the pin 17 thru a transverse opening 19 in the lower end of the valve stem 18 for holding the disc 16 on said stem to act as an abutment for one end of the spring when the latter is allowed to expand for seating the valve. Each clip 15 has its free end inturned as at 20 to prevent the same becoming easily detached from the spring when holding the latter compressed, so that the shape of the clips may possibly be more accurately described as substantially C-shaped. The central portions of each of the pair of clips 15 is outwardly offset as at 21, so that the ends of a flexible member may be readily attached thereto for retaining the pair of clips connected, so that accidental loss thereof is rendered less likely. The flexible member for connecting the pair of clips 15 may consist of chain or any suitable equivalent means but is herein shown as a strip of raw hide generally indicated at 22, the ends of which are provided with loops engaged with the offset portion 21.

The fixed abutment or jaw 7 and the movable jaw 10 of the spring compressing device are relatively narrow so as to expose a greater portion of the spring at each end of the latter, whereby the clips 15 may be engaged with said springs while held compressed in the compressing device, and upon placement of said disc at opposite sides of the spring.

From the above description, it will be seen that I have provided means of a simple, durable and practical nature, by the use of which the seating or actuating springs of valves may be readily compressed, and then retained in this condition upon the valve stem for permitting the spring retaining means to be readily applied to said stem. When the spring has been placed on the valve stem, and the pin placed in the opening 19, the operator can give the flexible member 22 a pull to release the spring, after which the clips may be pried off of the springs with a punch or a pair of long nosed pliers. It will be seen that the spring 6 will be effectively prevented from flexing laterally and consequently slipping from between the jaws 7 and 10, while at the same time a sufficient portion of the spring is exposed for permitting engagement of the pre-formed clips 15 therewith.

Minor changes may be made without departing from the spirit and scope of the invention as claimed.

What I claim as new is:

In an apparatus for facilitating assembling of valves and their actuating springs, a pair of substantially C-shaped rigid clips adapted to be engaged with the ends of the spring when the latter is compressed and at opposite sides of the same, a flexible member connecting said clips, said clips being provided with outwardly offset central portions, and said flexible member being secured at its ends to said offset portions of the clips.

In testimony whereof I affix my signature.

CHARLES A. LARSEN.